US012669336B2

(12) United States Patent
Morimoto et al.

(10) Patent No.:  US 12,669,336 B2
(45) Date of Patent:  Jun. 30, 2026

(54) INFORMATION PROCESSING DEVICE, STORAGE MEDIUM STORING COMPUTER PROGRAM FOR INFORMATION PROCESSING, AND INFORMATION PROCESSING METHOD

(71) Applicant: TOYOTA JIDOSHA KABUSHIKI KAISHA, Toyota (JP)

(72) Inventors: Takashi Morimoto, Edogawa-ku Tokyo-to (JP); Ken Tanabe, Koto-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 18/631,745

(22) Filed: Apr. 10, 2024

(65) Prior Publication Data

US 2024/0377203 A1  Nov. 14, 2024

(30) Foreign Application Priority Data

May 10, 2023  (JP) ................................. 2023-078114

(51) Int. Cl.
*G01C 21/30*  (2006.01)
*G01C 21/36*  (2006.01)
(52) U.S. Cl.
CPC ......... *G01C 21/30* (2013.01); *G01C 21/3602* (2013.01)
(58) Field of Classification Search
CPC ........................... G01C 21/30; G01C 21/3602; G01C 21/3658; G06V 20/588
USPC ........................................................ 701/514
See application file for complete search history.

(56) References Cited

U.S. PATENT DOCUMENTS

| | | | |
|---|---|---|---|
| 2003/0216858 A1* | 11/2003 | Sakai ................. | G01C 21/3626 |
| | | | 701/428 |
| 2005/0209748 A1 | 9/2005 | Watanabe et al. | |
| 2009/0157286 A1* | 6/2009 | Saito ..................... | B60W 30/12 |
| | | | 701/300 |
| 2012/0212612 A1* | 8/2012 | Imai ..................... | G06V 20/588 |
| | | | 348/148 |
| 2013/0321630 A1* | 12/2013 | Shin ..................... | G06V 10/507 |
| | | | 348/148 |
| 2014/0229106 A1* | 8/2014 | Ishikawa ................ | G06V 20/20 |
| | | | 701/533 |

(Continued)

FOREIGN PATENT DOCUMENTS

| | | |
|---|---|---|
| JP | 2005-258846 A | 9/2005 |
| JP | 2015-191445 A | 11/2015 |
| JP | 2017-123009 A | 7/2017 |

*Primary Examiner* — Tuan C To
*Assistant Examiner* — Dominick Mulder
(74) *Attorney, Agent, or Firm* — Dinsmore & Shohl LLP

(57)  ABSTRACT

An information processing device has a processor configured to detect a vanishing point where two lane marking lines in a front image representing environment ahead of a vehicle intersect, to detect a moving direction of the vehicle from a predetermined reference location to the vanishing point in the front image, to determine whether or not each of two moving directions has a different orientation in excess of a predetermined reference range with respect to the previously detected moving direction when the two moving directions have been detected, and to determine that a branching road that branches from a road in which the vehicle is traveling has appeared in the front image, when it has been determined that either of the two moving directions has a different orientation.

7 Claims, 9 Drawing Sheets

(56)     References Cited

U.S. PATENT DOCUMENTS

| | | | |
|---|---|---|---|
| 2014/0297181 A1* | 10/2014 | Kondo | G08G 1/09626 |
| | | | 701/532 |
| 2015/0362326 A1* | 12/2015 | Fujimoto | G01C 21/30 |
| | | | 701/428 |
| 2017/0148327 A1* | 5/2017 | Sim | G08G 1/167 |
| 2018/0237018 A1* | 8/2018 | Goto | G01C 21/3658 |
| 2018/0293447 A1* | 10/2018 | Kawano | G06T 7/12 |
| 2019/0122054 A1* | 4/2019 | Kumano | G06V 20/588 |
| 2020/0125861 A1* | 4/2020 | Sota | B62D 15/025 |
| 2020/0198648 A1* | 6/2020 | Ishioka | G05D 1/0088 |
| 2020/0369150 A1* | 11/2020 | Nakajima | G01C 21/367 |
| 2021/0097707 A1* | 4/2021 | Oba | G08G 1/167 |
| 2021/0158567 A1* | 5/2021 | Dai | G01C 21/3658 |
| 2021/0174098 A1* | 6/2021 | Li | G06T 7/536 |
| 2021/0271079 A1* | 9/2021 | Yoneda | G02B 27/0101 |
| 2023/0080630 A1* | 3/2023 | Seta | G06V 20/588 |
| | | | 382/104 |
| 2023/0311886 A1* | 10/2023 | Kato | B60W 30/18163 |
| | | | 701/23 |
| 2024/0123976 A1* | 4/2024 | Kuroda | B60W 30/09 |

* cited by examiner

FIG. 11

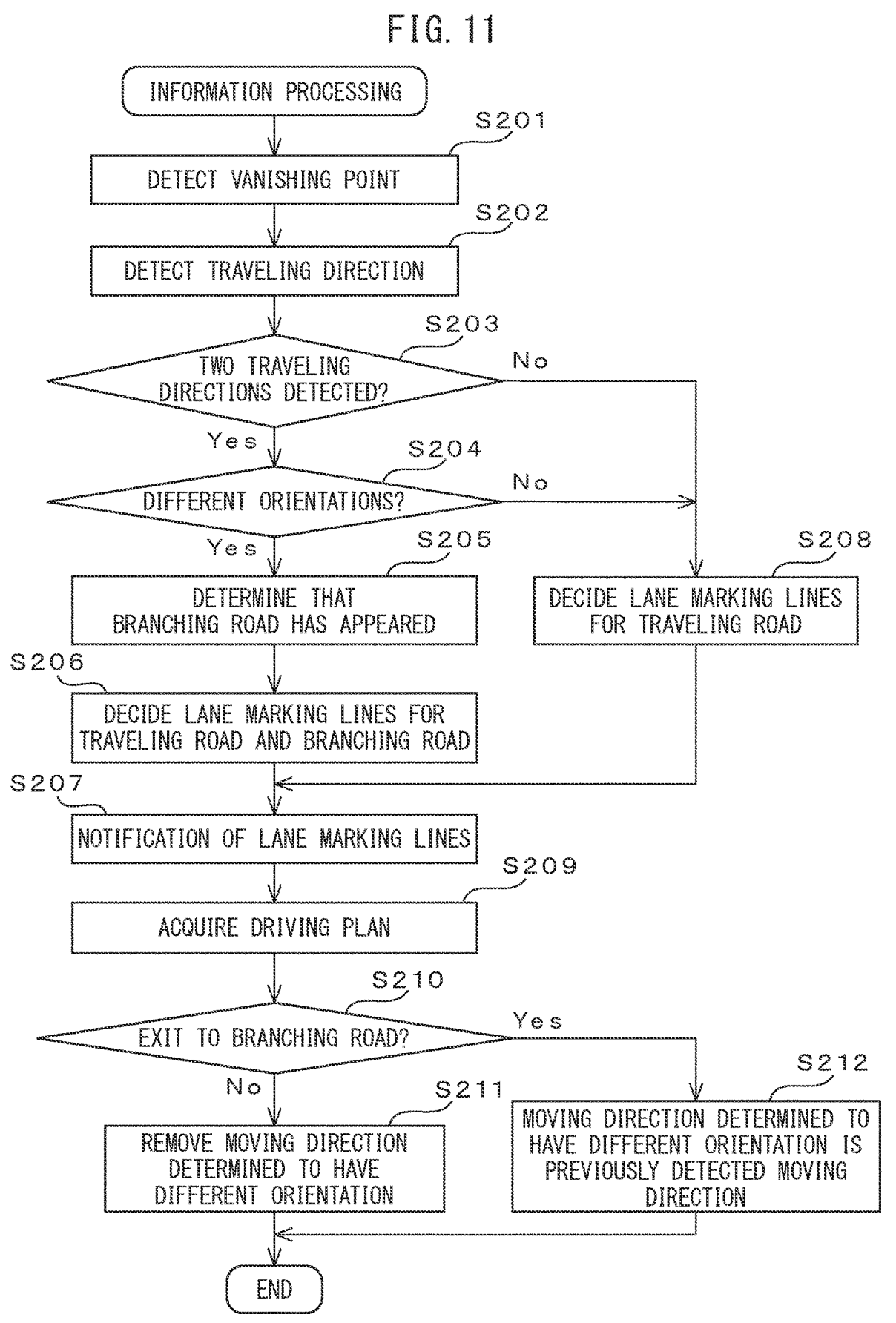

```
        ┌──────────────────────────┐
        │ INFORMATION PROCESSING   │
        └──────────────────────────┘
                    │          S201
                    ▼
        ┌──────────────────────────┐
        │  DETECT VANISHING POINT  │
        └──────────────────────────┘
                    │          S202
                    ▼
        ┌──────────────────────────┐
        │ DETECT TRAVELING DIRECTION│
        └──────────────────────────┘
                    │          S203
                    ▼
             TWO TRAVELING              No
         DIRECTIONS DETECTED? ──────────────┐
                    │                       │
                  Yes │      S204   No       │
                    ▼                        │
         DIFFERENT ORIENTATIONS? ────────────┤
                    │                        │
                  Yes │  S205          S208   │
                    ▼                    ▼
    ┌──────────────────────────┐  ┌──────────────────────────┐
    │     DETERMINE THAT       │  │ DECIDE LANE MARKING LINES│
    │ BRANCHING ROAD HAS APPEARED│  │   FOR TRAVELING ROAD    │
    └──────────────────────────┘  └──────────────────────────┘
   S206       │                                 │
              ▼                                  │
    ┌──────────────────────────┐                │
    │ DECIDE LANE MARKING LINES FOR│             │
    │TRAVELING ROAD AND BRANCHING ROAD│          │
    └──────────────────────────┘                │
   S207       │ ◄──────────────────────────────┘
              ▼
    ┌──────────────────────────┐
    │NOTIFICATION OF LANE MARKING LINES│
    └──────────────────────────┘
              │          S209
              ▼
    ┌──────────────────────────┐
    │   ACQUIRE DRIVING PLAN   │
    └──────────────────────────┘
              │          S210
              ▼
       EXIT TO BRANCHING ROAD?        Yes
              │ ──────────────────────────┐
            No │         S211              │  S212
              ▼                           ▼
    ┌──────────────────────────┐  ┌──────────────────────────┐
    │  REMOVE MOVING DIRECTION │  │MOVING DIRECTION DETERMINED TO│
    │   DETERMINED TO HAVE     │  │HAVE DIFFERENT ORIENTATION IS│
    │  DIFFERENT ORIENTATION   │  │ PREVIOUSLY DETECTED MOVING │
    └──────────────────────────┘  │        DIRECTION          │
              │                   └──────────────────────────┘
              │ ◄────────────────────────────┘
              ▼
        ┌──────────┐
        │   END    │
        └──────────┘
```

INFORMATION PROCESSING DEVICE, STORAGE MEDIUM STORING COMPUTER PROGRAM FOR INFORMATION PROCESSING, AND INFORMATION PROCESSING METHOD

CROSS-REFERENCE TO RELATED APPLICATIONS

This application claims priority to Japanese Patent Application No. 2023-078114 filed May 10, 2023, the entire contents of which are herein incorporated by reference.

FIELD

The present disclosure relates to an information processing device, a storage medium storing a computer program for information processing, and an information processing method.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route.

The automatic control system also uses a camera to acquire front images representing the environment ahead of the vehicle, and detects lane marking lines (or lane boundary lines) represented in the front images. The automatic control system identifies traffic lanes partitioned by the lane marking lines, and controls the vehicle so that the vehicle travels in a lane.

When a branching location exists where a branching road branches from the traveling road on which the vehicle is traveling, the traveling road and branching road appear in the front images. The automatic control system detects the lane marking lines of the traveling road and the lane marking lines of the branching road from the front images.

When the vehicle is scheduled to proceed on the traveling road, the automatic control system selects the lane marking line of the traveling road and controls the vehicle. On the other hand, when the vehicle is scheduled to proceed on the branching road, the automatic control system selects the lane marking line of the branching road and controls the vehicle.

The automatic control system determines whether or not the branching road appears ahead of the vehicle based on the front images.

Japanese Unexamined Patent Publication No. 2017-123009 proposes a technique for recognizing the traveling lane in which the vehicle is traveling and an adjacent lane adjacent to the traveling lane, based on images, and determining whether or not a branching situation exists in which a branching lane branches from the traveling lane, based on differences in the change tendencies in the lane widths of the traveling lane and the adjacent lane.

SUMMARY

In the technique described in Japanese Unexamined Patent Publication No. 2017-123009, however, it has not been possible to determine the existence of a branching situation until the adjacent lane appears next to the traveling lane in which the vehicle is traveling.

It is therefore an object of the present disclosure to provide an information processing device that can rapidly detect a branching road that branches from a road in which a vehicle is traveling, based on a front image representing the environment ahead of the vehicle.

(1) According to one embodiment of the present disclosure there is provided an information processing device. The information processing device has a processor configured to detect a vanishing point where two lane marking lines in a front image representing environment ahead of a vehicle intersect, detect a moving direction of the vehicle from a predetermined reference location to the vanishing point in the front image, determine whether or not each of two moving directions has a different orientation in excess of a predetermined reference range with respect to the previously detected moving direction when the two moving directions have been detected, and determine that a branching road that branches from a road in which the vehicle is traveling has appeared in the front image, when it has been determined that either of the two moving directions has a different orientation.

(2) In the information processing device of (1) above, the processor is further configured to determine whether or not the vehicle will exit from the branching road based on a driving plan representing the scheduled traveling trajectory of the vehicle, which is generated based on determination results wherein it has been determined that the branching road has appeared, and remove the moving direction determined to have a different orientation from the previously detected moving direction, when it has been determined that the vehicle will not exit to the branching road.

(3) In the information processing device of (2) above, the processor is further configured to set the moving direction determined to have a different orientation to be the previously detected moving direction, when it has been determined that the vehicle will exit from the branching road.

(4) In the information processing device according to any one of (1) to (3) above, the processor is further configured to determine whether or not the vehicle is scheduled to exit to the branching road which branches from the traveling road on which it is traveling based on a vehicle navigation route, within a predetermined range from the current location of the vehicle in a direction of travel, and remove lane marking lines that have a vanishing point, representing the moving direction determined to have a different orientation, from among the lane marking lines detected in the front image, when it has been determined that the branching road has appeared and it has been determined that the vehicle is not scheduled to exit from the traveling road to the branching road.

(5) In the information processing device according to any one of (1) to (4) above, the predetermined reference location in the front image represents the location of the vehicle.

(6) According to another embodiment, a storage medium storing a computer program for information processing is provided. The computer program for information processing causes a processor to execute a process and the process includes detecting a vanishing point where two lane marking lines in a front image representing environment ahead of a vehicle intersect, detecting a moving direction of the vehicle from a predetermined reference location to the vanishing point in the front image, determining whether or not each of two moving directions has a different orientation in excess of a predetermined reference range with respect to the previously detected moving direction when the two moving directions have been detected; and determining that a branching road that branches from a road in which the vehicle is traveling has appeared in the front image, when it has been determined that either of the two moving directions has a different orientation.

(7) According to yet another embodiment of the present disclosure, an information processing method is provided. The information processing method is carried out by an information processing device and the method includes detecting a vanishing point where two lane marking lines in a front image representing environment ahead of a vehicle intersect, detecting a moving direction of the vehicle from a predetermined reference location to the vanishing point in the front image, determining whether or not each of two moving directions has a different orientation in excess of a predetermined reference range with respect to the previously detected moving direction when the two moving directions have been detected; and determining that a branching road that branches from a road in which the vehicle is traveling has appeared in the front image, when it has been determined that either of the two moving directions has a different orientation.

The information processing device of the present disclosure can rapidly detect a branching road that branches from a road in which a vehicle is traveling, based on a front image representing the environment ahead of the vehicle.

The object and aspect of the present disclosure will be realized and attained by the elements and combinations particularly pointed out in the claims. It is to be understood that both the foregoing general description and the following detailed description are exemplary and explanatory and are not restrictive of the present disclosure, as claimed.

BRIEF DESCRIPTION OF DRAWINGS

FIG. 11 is an example of an operation flow chart for information processing according to Modified Example 1, by the information processing device of the embodiment.

DESCRIPTION OF EMBODIMENTS

Figure 1:
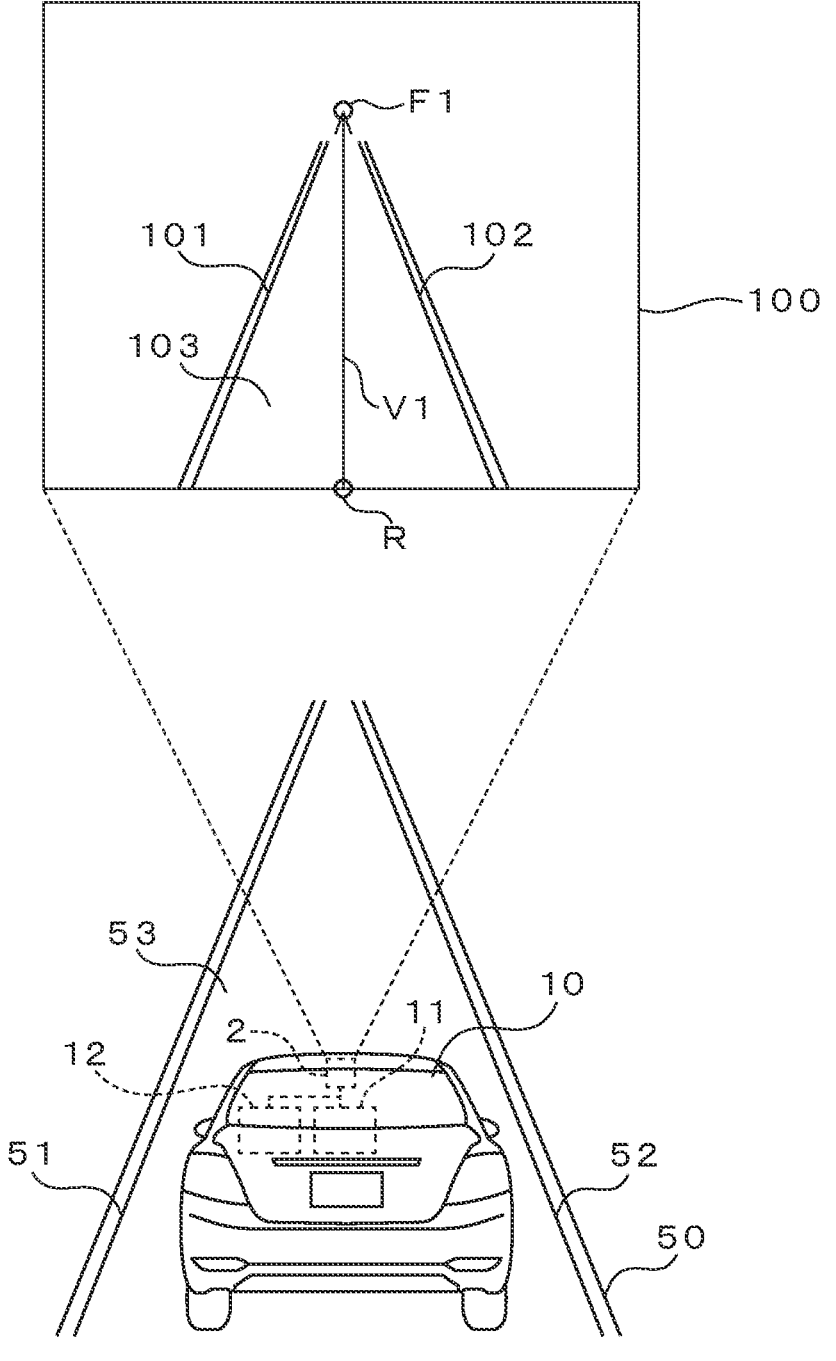
FIG. 1 is a diagram showing operation of the information processing device according to an embodiment of the present disclosure in overview (1).
Figure 2:
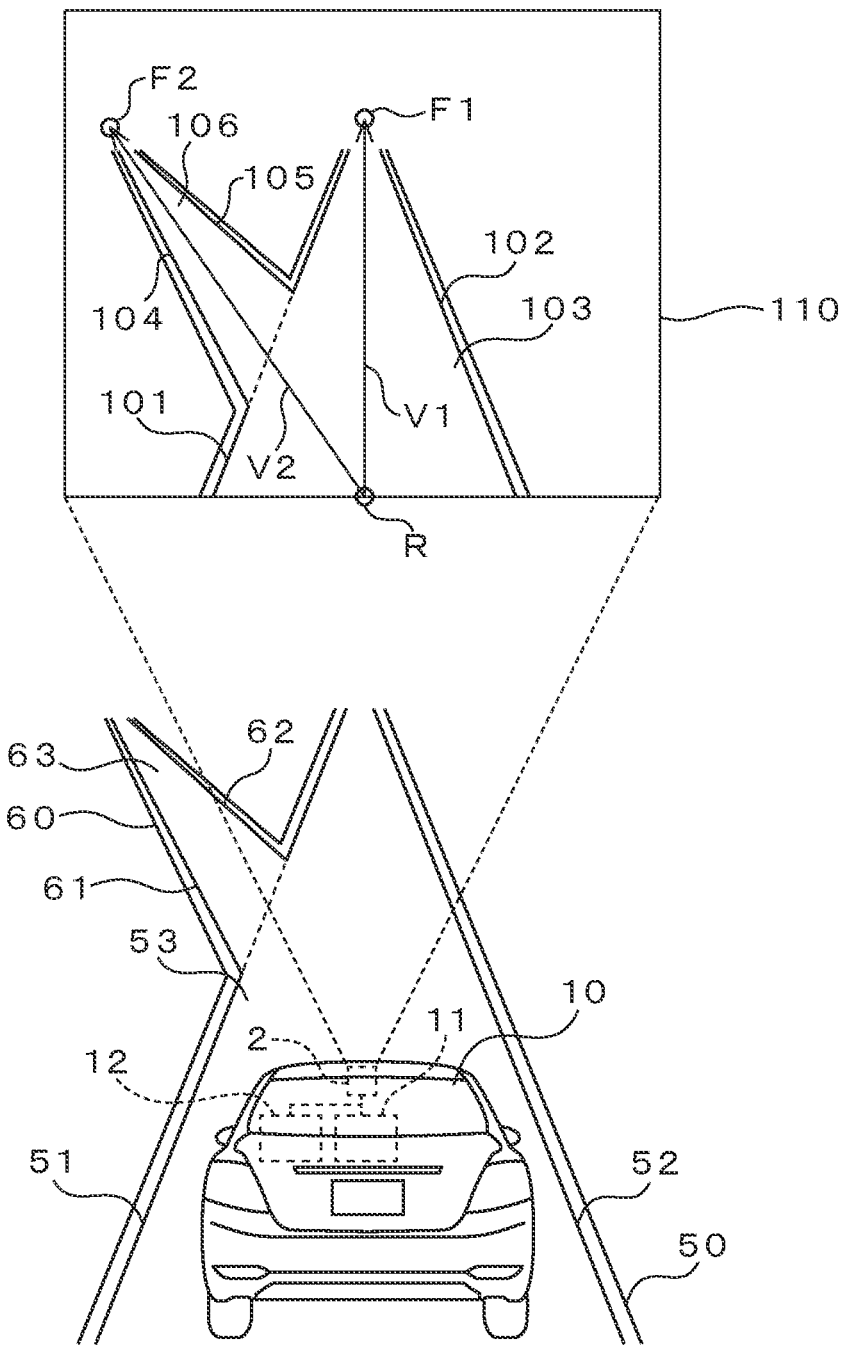
FIG. 2 is a diagram showing operation of the information processing device according to the embodiment in overview (2).

FIG. 1 and FIG. 2 are diagrams showing operation of the information processing device 12 according to the embodiment in overview. Operation relating to information processing by the information processing device 12 disclosed herein will now be described in overview with reference to FIG. 1 and FIG. 2.

The vehicle 10 has an automatic control device 11 and an information processing device 12. The automatic control device 11 controls operation of the vehicle 10 based on front images taken by the front camera 2. The environment ahead of the vehicle 10 is represented in the front images. The vehicle 10 may also be a self-driving vehicle. Based on the front images, the information processing device 12 generates information for control of the vehicle 10 by the automatic control device 11.

In the example shown in FIG. 1, the vehicle 10 is traveling on a road 50. The road 50 has a left lane marking line 51, a right lane marking line 52, and a lane 53 delineated by the left lane marking line 51 and right lane marking line 52. The vehicle 10 is traveling on the lane 53.

The information processing device 12 detects two lane marking lines 101, 102 in a front image 100 taken by the camera 2. The lane marking line 101 corresponds to the left lane marking line 51, and the lane marking line 102 corresponds to the right lane marking line 52. The information processing device 12 also detects a vanishing point F1 where the two lane marking lines 101, 102 intersect in the front image 100.

The information processing device 12 further detects a moving direction V1 for movement of the vehicle 10 from a predetermined reference location R to the vanishing point F1 in the front image 100. The reference location R may be, for example, the location corresponding to the center of the front image 100 in the widthwise direction of the vehicle 10. The widthwise direction of the vehicle 10 is the direction perpendicular to the longitudinal direction of the vehicle 10. The reference location R is situated at the lower end center of the front image 100.

Since only one moving direction V1 has been detected, the information processing device 12 decides to set the lane marking line 101 and lane marking line 102, which define the vanishing point F1 corresponding to the moving direction V1 in the front image 100, as lane marking lines delineating the region in which the vehicle 10 is traveling.

The information processing device 12 notifies the automatic control device 11 of the lane marking line 101 and lane marking line 102 in the front image 100.

The automatic control device 11 controls operation of the vehicle 10 based on the lane marking line 101 and lane marking line 102 in the front image 100. For example, based on the front image 100, the automatic control device 11 drives the vehicle 10 so as to travel in the region 103 between the lane marking line 101 and lane marking line 102. The vehicle 10 is thus controlled to travel in the lane 53 delineated by the left lane marking line 51 and right lane marking line 52 of the road 50.

In the example shown in FIG. 2, the vehicle 10 is traveling on a road 50. A road 60 branches off from the road 50 ahead of the vehicle 10. The road 60 has a left lane marking line 61, a right lane marking line 62, and a lane 63 delineated by the left lane marking line 61 and right lane marking line 62.

The information processing device 12 detects two lane marking lines 101, 102 in a front image 110. The lane marking line 101 corresponds to the left lane marking line 51 of the road 50, and the lane marking line 102 corresponds to the right lane marking line 52 of the road 50. The information processing device 12 also detects a vanishing point F1 where the two lane marking lines 101, 102 intersect in the front image 110.

The information processing device 12 also detects two lane marking lines 104, 105 in the front image 110. The lane marking line 104 corresponds to the left lane marking line 61 of the road 60, and the lane marking line 105 corresponds to the right lane marking line 62 of the road 60. The information processing device 12 also detects a vanishing point F2 where the two lane marking lines 104, 105 intersect in the front image 110.

The information processing device 12 further detects a moving direction V1 for movement of the vehicle 10 from a reference location R to the vanishing point F1 in the front image 110. The information processing device 12 further detects a moving direction V2 for movement of the vehicle 10 from a reference location R to the vanishing point F2 in the front image 110. The moving direction V2 is a newly detected moving direction.

Since the moving direction V2 has a different orientation in excess of a predetermined reference range with respect to the previously detected moving direction V1, the information processing device 12 determines that the road 60 branching from the road 50 on which the vehicle 10 is traveling has appeared in the front image 110.

When the road 60 is shown to branch from the road 50 in the front image 110, the information processing device 12 can determine that the road 60 has appeared based on the moving direction V2 representing the road 60. The information processing device 12 can rapidly determine that the road 60 has appeared, although the timing at which the road 60 appears in the front image 110 will depend on the visual field of the camera 2 and the mounting angle of the camera 2 on the vehicle 10.

The information processing device 12 decides to set the lane marking line 101 and lane marking line 102, which define the vanishing point F1 corresponding to the moving direction V1 in the front image 110, as lane marking lines of the road 50 in which the vehicle 10 is currently traveling.

The information processing device 12 also decides to set the lane marking line 104 and lane marking line 105, which define the vanishing point F2 corresponding to the moving direction V2 in the front image 110, as lane marking lines of the branching road 60 which branches from the road 50 in which the vehicle 10 is currently traveling.

The information processing device 12 notifies the automatic control device 11 of the lane marking line 101 and lane marking line 102 in the front image 110, as lane marking lines of the road 50 in which the vehicle 10 is currently traveling.

The information processing device 12 also notifies the automatic control device 11 of the lane marking line 104 and lane marking line 105 in the front image 110, as lane marking lines of the road 60 which branches.

When the vehicle 10 is to progress on the road 50 without exiting from the road 50 to the road 60, the automatic control device 11 controls the operation of the vehicle 10 based on the lane marking line 101 and lane marking line 102 of the front image 110. For example, based on the front image 110, the automatic control device 11 drives the vehicle 10 so as to travel in the region 103 between the lane marking line 101 and lane marking line 102. The vehicle 10 is thus controlled to travel in the lane 53 delineated by the left lane marking line 51 and right lane marking line 52 of the road 50.

When the vehicle 10 is to exit from the road 50 to the road 60, on the other hand, the automatic control device 11 controls operation of the vehicle 10 based on the lane marking line 104 and lane marking line 105 of the front image 110, after the vehicle 10 has exited from the road 50. For example, based on the front image 110, the automatic control device 11 drives the vehicle 10 so as to travel in the region 106 between the lane marking line 104 and lane marking line 105. The vehicle 10 is thus controlled to travel in the lane 63 delineated by the left lane marking line 61 and right lane marking line 62 of the road 60.

As explained above, the information processing device 12 can rapidly detect a branching road that branches from a road in which a vehicle is traveling, based on front images representing the environment ahead of the vehicle 10.

By having the information processing device 12 notify the automatic control device 11 of the lane marking lines of the road 50 on which the vehicle 10 is traveling and the road 60 which branches, the automatic control device 11 can generate a driving plan which properly takes into account the region in which the vehicle 10 is traveling.

Figure 3:
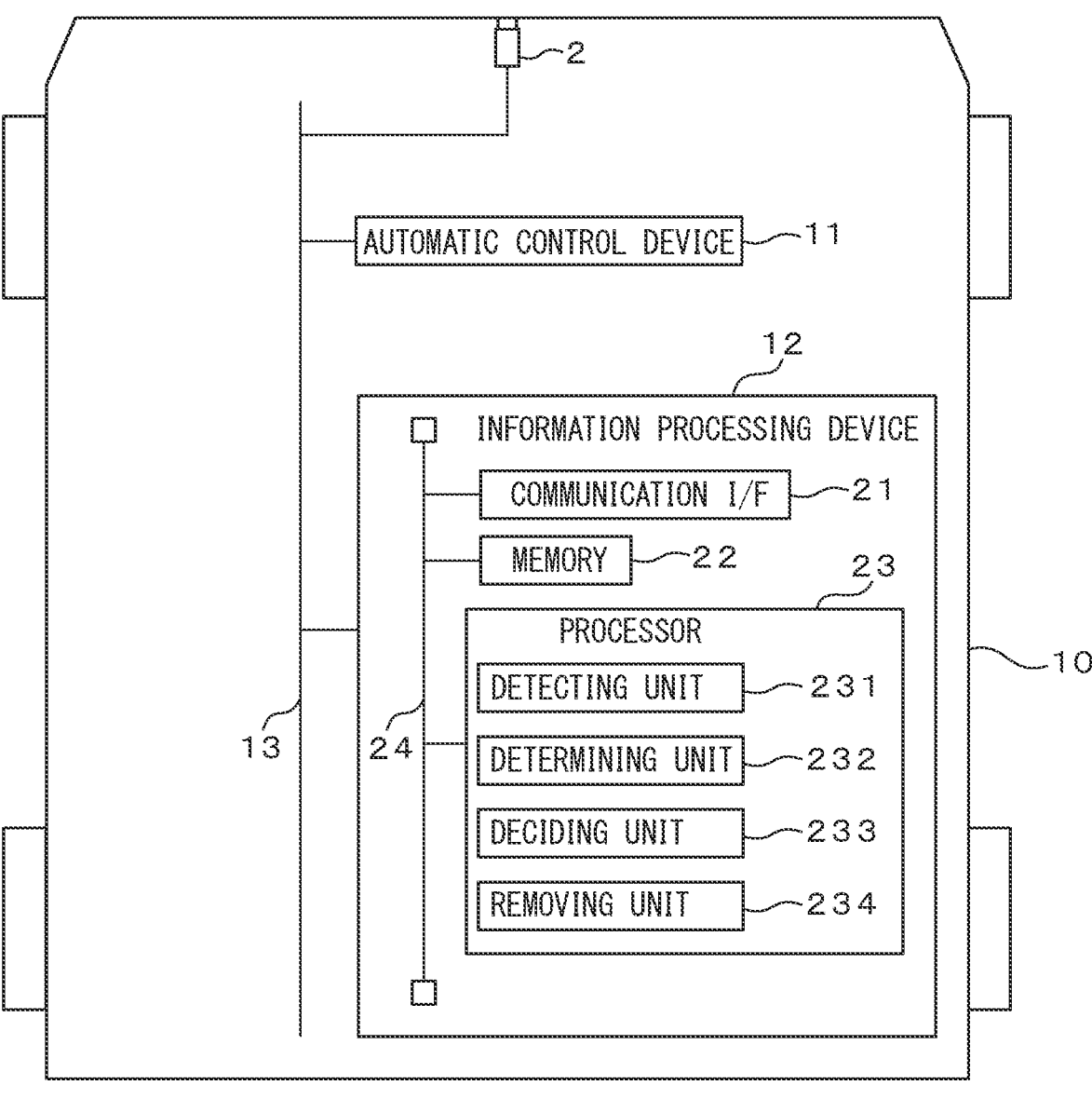
FIG. 3 is a hardware configuration diagram for a vehicle in which the information processing device of the embodiment is mounted.

FIG. 3 is a hardware configuration diagram for a vehicle 10 in which the information processing device 12 of the embodiment is mounted. The vehicle 10 has a front camera 2, an automatic control device 11, and an information processing device 12. The vehicle 10 may also have a LiDAR sensor, as another distance sensor (not shown) for measurement of the distance of the vehicle 10 to surrounding objects.

The front camera 2, automatic control device 11 and information processing device 12 are connected in a communicable manner via an in-vehicle network 13 conforming to the Controller Area Network standard.

The camera 2 is mounted inside the vehicle 10 and directed toward the front of the vehicle 10. The camera 2, for example, takes a front image in which the environment of a predetermined region ahead of the vehicle 10 is shown, at a predetermined cycle. The front image can show the road in the predetermined region ahead of the vehicle 10, and road features such as surface lane marking lines on the road. The front image may also include other vehicles which are located ahead of the vehicle 10. The camera 2 has a 2D detector composed of an array of photoelectric conversion elements with visible light sensitivity, such as a CCD or C-MOS, and an imaging optical system that forms an image of the photographed region on the 2D detector.

Each time a front image is taken, the front camera 2 outputs the front image and camera imaging time at which the front image was taken to the automatic control device 11 and information processing device 12 via the in-vehicle network 13. The front image is also used for processing at the automatic control device 11 to estimate the location of the vehicle 10. At the automatic control device 11, the front image is also used for processing to detect objects surrounding the vehicle 10. The front image is also used for information processing by the information processing device 12. The vehicle 10 may also have another camera mounted in the vehicle 10 and directed toward the rear of the vehicle 10.

The automatic control device 11 controls operation including traveling of the vehicle 10. Based on the navigation map information, the destination location of the vehicle 10, and positioning information representing the current location of the vehicle 10 input from a GNSS receiver (not shown), the automatic control device 11 creates a navigation route from the current location to the destination location of the vehicle 10. The automatic control device 11 outputs the current location of the vehicle 10 and the navigation route to the information processing device 12 via the in-vehicle network 13.

The automatic control device 11 also estimates the location and orientation of the vehicle 10 at the camera imaging time, based on lane marking lines represented in high-precision map information, and lane marking lines surrounding the vehicle 10 which are represented in front images taken by the camera 2. The automatic control device 11 also estimates the road traveling lane where the vehicle 10 is located, based on the lane marking lines represented in the high-precision map information and on the estimated location and estimated declination of the vehicle 10.

The automatic control device 11 further detects objects around the vehicle 10, and their types, based on the front images. Objects also include other vehicles traveling around the vehicle 10.

The automatic control device 11 selects a traffic lane on the road on which the vehicle 10 is traveling, within the nearest driving zone (for example, 10 km) selected from the navigation route, based on the high-precision map information, the navigation route and the current location of the vehicle 10, and creates a traveling lane plan representing the scheduled traveling lane for traveling of the vehicle 10.

The automatic control device 11 also creates a driving plan representing the scheduled traveling trajectory of the vehicle 10 up until a predetermined time (for example, 5 seconds), based on the front images, the traveling lane plan, the high-precision map information, the current location of the vehicle 10, the surrounding environment information and the vehicle status information. The surrounding environment information includes the locations of other vehicles traveling around the vehicle 10. The vehicle status information includes the current location of the vehicle 10, and the vehicle speed, acceleration and traveling direction. The automatic control device 11 generates a driving plan for control of operation including steering, actuation and braking of the vehicle 10, so that the vehicle 10 travels through the region between the lane marking lines detected in the front images.

The automatic control device 11 also controls each unit of the vehicle 10 based on the driving plan. For example, the automatic control device 11 outputs the control signal based on the driving plan, to an actuator (not shown) that controls the steering wheel, a drive unit (not shown), or the brake (not shown), via the in-vehicle network 13.

The information processing device 12 carries out detection processing, determination processing, decision processing and removal processing. For this purpose, the information processing device 12 has a communication interface (IF) 21, a memory 22 and a processor 23. The communication interface 21, memory 22 and processor 23 are connected via signal wires 24. The communication interface 21 has an interface circuit to connect the information processing device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23 of each device. The memory 22 also stores internal parameters such as the optical axis direction of the camera 2 and the focal length and viewing angle of the imaging optical system, and external parameters such as the mounting position and orientation of the camera 2.

All or some of the functions of the information processing device 12 are functional modules driven by a computer program operating on the processor 23, for example. The processor 23 has a detecting unit 231, a determining unit 232, a deciding unit 233 and a removing unit 234. The processor 23 comprises one or more CPUs (Central Processing Units) and their peripheral circuits. The processor 23 may also have other computing circuits such as a logical operation unit, numerical calculation unit or graphics processing unit. Alternatively, the functional module of the processor 23 may be a specialized computing circuit in the processor 23. The information processing device 12 is an electronic control unit (ECU), for example. Operation of the information processing device 12 will be described in detail below.

For FIG. 3, the automatic control device 11 and the information processing device 12 were described as separate devices, but all or some of the devices may also be constructed as a single device.

Figure 4:
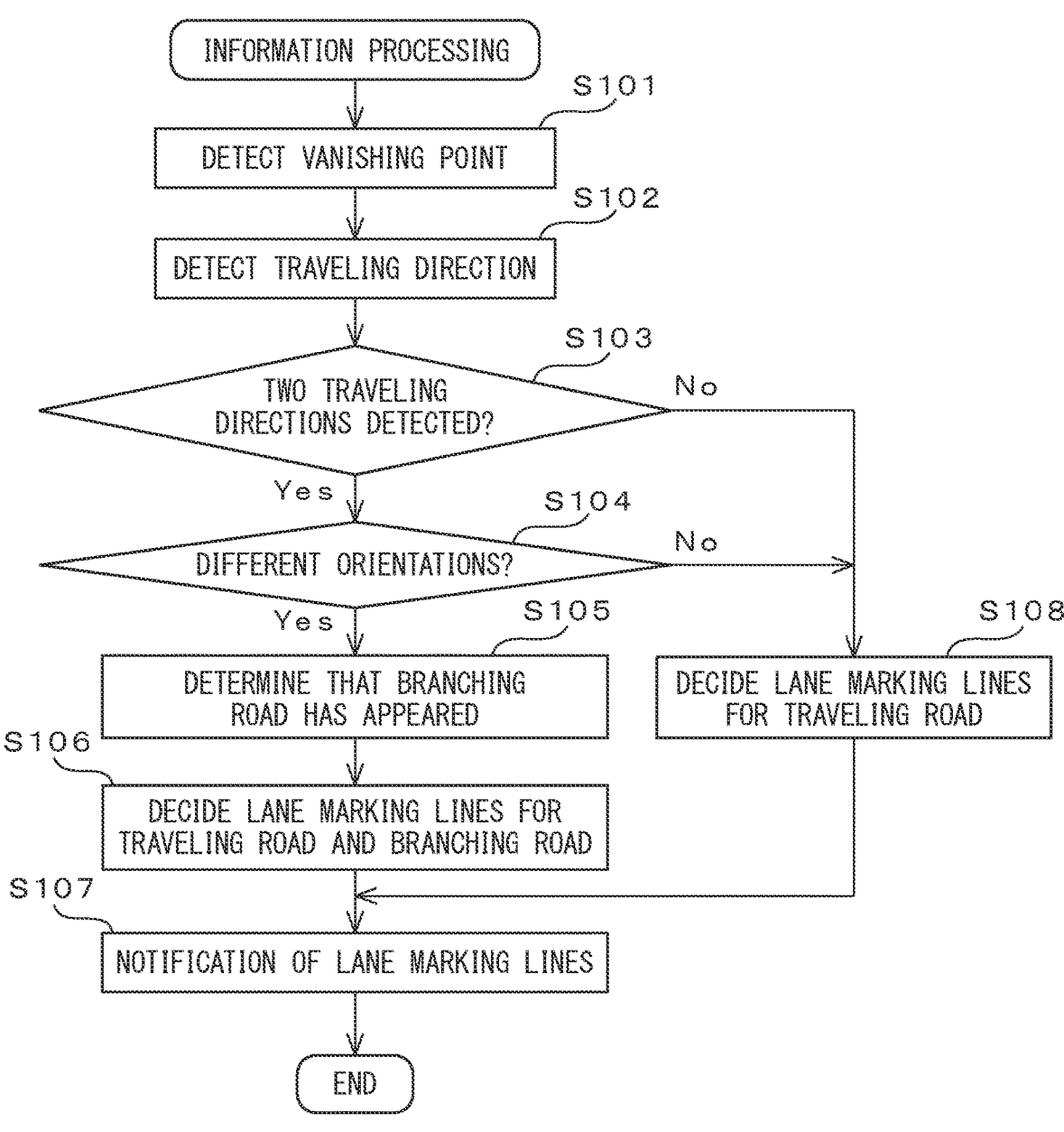
FIG. 4 is an example of an operation flow chart for information processing by the information processing device of the embodiment.

FIG. 4 is an example of an operation flow chart for information processing by the information processing device 12 of the embodiment. Information processing by the information processing device 12 will be described below with reference to FIG. 4. The information processing device 12 carries out information processing according to the operation flow chart shown in FIG. 4, at an information processing time set with a predetermined cycle.

First, the detecting unit 231 detects a vanishing point where the two lane marking lines intersect in the front images taken by the camera 2 (step S101). The location of the vanishing point is represented on an image coordinate system. The image coordinate system has the top left corner of the front image as the origin, with the x-axis extending horizontally to the right from the origin and the y-axis extending downward from the origin, perpendicular to the x-axis. The detecting unit 231 is an example of the vanishing point detector. Processing whereby the detecting unit 231 detects a vanishing point will be described below with reference to FIG. 5 to FIG. 10.

The detecting unit 231 then detects a moving direction for the vehicle 10 from a predetermined reference location to the vanishing point in the front image (step S102). The detecting unit 231 is an example of the direction detector. The reference location may be the location corresponding to the vehicle 10 in the front images. For example, the reference location may be a location at the center in the widthwise direction of the vehicle 10. In embodiments, the reference location is situated at the lower end in the front images. The reference location is represented on the image coordinate system. The location of the reference location in the front images may be decided based on the internal parameters and external parameters of the camera 2. For example, when the camera 2 is mounted at the center location in the widthwise direction of the vehicle 10 in an orientation with the optical axis toward the front of the vehicle 10, the reference location is the center location at the lower end in the front images.

The moving direction of the vehicle 10 is represented in the image coordinate system, as the direction of a vector with the reference location as the initial point and the vanishing point as the terminal point. When two or more vanishing points have been detected in a front image, the moving direction of the vehicle 10 is detected with respect to each vanishing point.

The determining unit 232 then determines whether or not two moving directions have been detected by the detecting unit (step S103).

When two moving directions have been detected (step S103—Yes), the determining unit 232 determines whether or not each of the two moving directions has a different orientation in excess of a predetermined reference range with respect to the previously detected moving direction (step S104). The previously detected moving direction may be the most recent average moving direction (within 3 seconds, for example). The determining unit 232 is an example of the first determining unit.

First, the vector representing the current detected moving direction and a vector representing the previously detected moving direction are superimposed on the image coordinate system with their respective initial points at the reference location. The angle of the vector representing the current detected moving direction with respect to the direction of the vector representing the previously detected moving direction is calculated. It is determined whether or not this angle exceeds a predetermined reference angle. The reference angle may be 30 milliradians (mil), for example. Both edges of the road with a width of 3.5 m will be at about 30 milliradians at a distance of 100 m ahead of the vehicle 10.

When the direction of the vector representing the current detected moving direction is in excess of the reference angle with respect to the direction of the vector representing the previously detected moving direction, in the image coordinate system, the determining unit 232 determines that the direction of the moving direction is different. When the direction of the vector representing the current detected moving direction indicates a branching road that branches from the road in which the vehicle 10 is currently traveling, then it is determined that the orientation of the moving direction is different. The direction of the vector representing the current detected moving direction thus signifies the appearance of a branching road.

On the other hand, when the direction of the vector representing the current detected moving direction is not in excess of the reference angle with respect to the direction of the vector representing the previously detected moving direction in the image coordinate system, the determining unit 232 determines that the orientation of the moving direction is not different. The direction of the vector representing the current detected moving direction may be said to coincide with the direction of the vector representing the previously detected moving direction. When the direction of the vector representing the current detected moving direction indicates the road in which the vehicle 10 is currently traveling, then it is determined that the orientation of the moving direction is not different. The direction of the vector representing the current detected moving direction is therefore within the reference angle with respect to the direction of the vector representing the previously detected moving direction.

When the branching road is shown to branch from the traveling road in a front image, the information processing device 12 can determine that the branching road has appeared based on the moving direction representing the branching road. The information processing device 12 can rapidly determine that the branching road has appeared, although the timing at which the branching road appears in the front image will depend on the visual field of the camera 2 and the mounting angle of the camera 2 on the vehicle 10.

A smaller reference angle allows the information processing device 12 to determine more rapidly that the branching road has appeared. However, a smaller reference angle may also result in erroneous determination of branching roads. In embodiments, the size of the reference angle is therefore decided in consideration of precision.

When it has been determined that either of the two moving directions has a different orientation (step S104—Yes), the determining unit 232 determines that a branching road which branches from the road on which the vehicle 10 is traveling has appeared in the front image (step S105). When it has been determined that either of the two moving directions has a different orientation, it is possible that the front image shows lane marking lines of the traveling road in which the vehicle 10 is currently traveling, and lane marking lines of a branching road. The determining unit is an example of a second determining unit.

The vector representing the same direction as the previously detected moving direction corresponds to the traveling road in which the vehicle 10 is currently traveling. The vector representing a different direction from the previously detected moving direction corresponds to the branching road.

Next, the deciding unit 233 decides on the lane marking lines of the traveling road in which the vehicle 10 is currently traveling and the lane marking lines of the branching road, in the front image (step S106). The two lane marking lines defining the vanishing point which represents the terminal point of the vector representing the same direction as the previously detected moving direction are the lane marking lines of the traveling road. The two lane marking lines defining the vanishing point which represents the terminal point of the vector representing the different direction from the previously detected moving direction are the lane marking lines of the branching road.

The deciding unit 233 then notifies the automatic control device 11 of information representing the locations of the lane marking lines in the front image, and the series of processing steps is complete (step S107). Specifically, the deciding unit 233 notifies the automatic control device 11 of the front image, together with information representing the locations of the two lane marking lines delineating the traveling lane of the traveling road in which the vehicle 10 is currently traveling, and information representing the locations of the two lane marking lines delineating the lane of the branching road.

When the vehicle 10 is to proceed on the traveling road without exiting from the traveling road to the branching road, the automatic control device 11 generates a driving plan for the vehicle 10 so that it travels in the region between the two lane marking lines delineating the lane of the traveling road, based on the front image. The automatic control device 11 may also generate a driving plan by converting the front image to a bird's eye view based on the internal parameters and external parameters of the camera 2.

When the vehicle 10 is to exit from the road 50 to the road 60, on the other hand, the automatic control device 11 generates a driving plan for the vehicle 10 so that it travels in the region between the two lane marking lines delineating the lane of the branching road, based on the front image.

When two moving directions are not detected (step S103—No), or when it has been determined that neither of the two moving directions has a different orientation, (step S104—No), the deciding unit 233 decides on the lane marking lines of the traveling road in which the vehicle 10 is currently traveling, in the front image (step S108). The two lane marking lines defining the vanishing point which represents the terminal point of the vector representing the same direction as the previously detected moving direction are the lane marking lines of the traveling road. For example, when the vehicle 10 is traveling on a road with two or more lanes, it is determined that neither of the two moving directions has a different orientation.

The deciding unit 233 then notifies the automatic control device 11 of the front image and the information representing the locations of the lane marking lines in the front image (step S107), and the series of processing steps is complete. Specifically, the deciding unit 233 notifies the automatic control device 11 of the front image, together with information representing the locations of the two lane marking lines delineating the traveling lane of the traveling road in which the vehicle 10 is currently traveling. The automatic control device 11 generates a driving plan for the vehicle 10 so that it travels in the region between the two lane marking lines delineating the lane of the traveling road, based on the front image.

Processing by which the detecting unit 231 detects a vanishing point in a front image in step S101 will now be explained with reference to FIG. 5 to FIG. 10.

Figure 5:
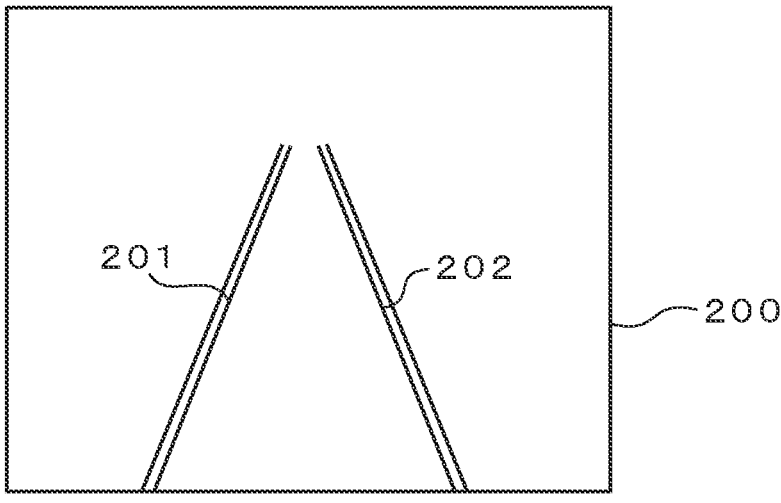
FIG. 5 is a drawing showing an example of a front image.

FIG. 5 is a drawing showing an example of a front image. The front image 200 shown in FIG. 5 corresponds to the front image 100 of FIG. 1. The detecting unit 231 detects regions 201, 202 corresponding to the two lane marking lines represented in the front image 200. The detecting unit 231 has a classifier trained to identify lane marking lines represented on road surfaces from images. By inputting the front image 200 into the classifier, the detecting unit 231 detects a region 201 and a region 202 respectively corresponding to the two lane marking lines represented in the front image 200. The positions of the pixels in the region 201 and region 202 are represented in the image coordinate system.

Figure 6:
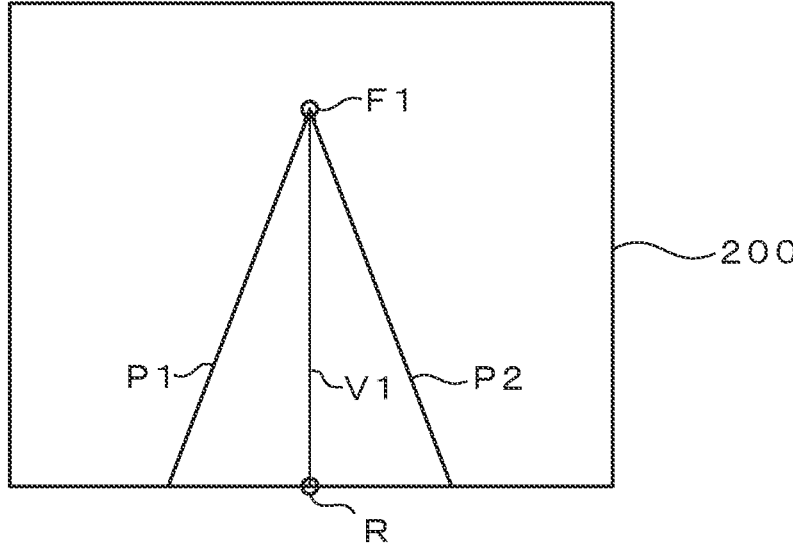
FIG. 6 is a diagram showing detection of a vanishing point and moving direction from a front image (1).

FIG. 6 is a diagram showing detection of a vanishing point and moving direction from a front image 200. The detecting unit 231 finds a polynomial representing the lane marking lines based on the positions of the pixels represent-ing the lane marking lines, for both the region 201 and region 202. For example, the detecting unit 231 finds a polynomial using the least-square method.

The detecting unit 231 sets the vanishing point for both the region 201 and region 202 to be the intersection F1 between curves P1 and P2 represented by the polynomial. When the road is straight, the lane marking line is nearly a straight line, and when the road is curved, the lane marking line is nearly a curve.

The detecting unit 231 then calculates a vector V1 with the initial point being the reference location R set at the center at the lower end of the front image 200, and the terminal point being the vanishing point F1. The vector V1 represents the moving direction of the vehicle 10.

Two lane marking lines were detected in the example described above, but if three or more lane marking lines are detected, the detecting unit 231 calculates the vanishing point and moving direction for two adjacent lane marking lines.

Figure 7:
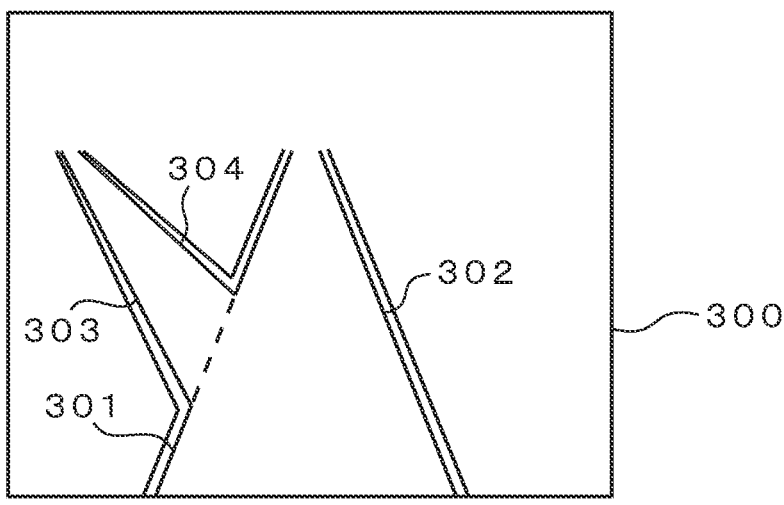
FIG. 7 is a drawing showing another example of a front image.

FIG. 7 is a drawing showing another example of a front image. The front image 300 shown in FIG. 7 corresponds to the front image 110 of FIG. 2. The detecting unit 231 detects regions 301, 302, 303, 304 corresponding to each of the four lane marking lines represented in the front image 300. The positions of the pixels in the regions 301, 302, 303, 304 are represented in the image coordinate system.

Figure 8:
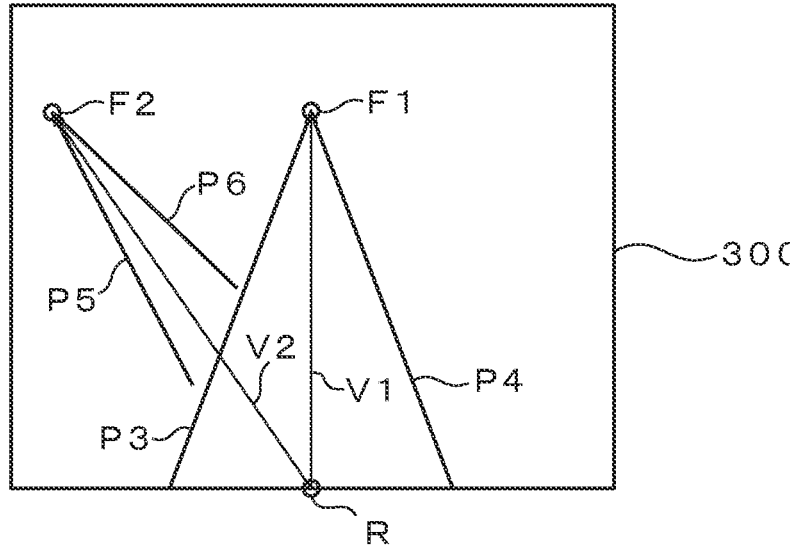
FIG. 8 is a diagram showing detection of a vanishing point and moving direction from a front image (2).

FIG. 8 is a diagram showing detection of a vanishing point and moving direction from a front image 200. The detecting unit 231 finds a polynomial representing the lane marking lines based on the positions of the pixels represent-ing the lane marking lines, for each of the regions 301, 302, 303, 304.

The detecting unit 231 sets the vanishing point for the adjacent regions 301, 302 to be the intersection F1 between curves P3 and P4 represented by the polynomial. The detecting unit 231 also sets the vanishing point for the adjacent regions 303, 304 to be the intersection F2 between curves P5 and P6 represented by the polynomial. When scanning the front image along the x-axis direction at a predetermined position on the y-axis, two adjacently situ-ated regions without other intervening regions are consid-ered to be adjacent regions.

The detecting unit 231 then calculates a vector V1 with the initial point being the reference location R set at the center at the lower end of the front image 200, and the terminal point being the vanishing point F1. The vector V1 represents the moving direction of the vehicle 10. The detecting unit 231 then calculates a vector V2 with the initial point being the reference location R set at the center at the lower end of the front image 200, and the terminal point being the vanishing point F2. The vector V2 represents another moving direction of the vehicle 10.

The method by which the detecting unit 231 calculates the vanishing point is not limited to the method described above. For example, the detecting unit 231 may detect the vanishing point by the following method in the front image shown in FIG. 9.

Figure 9:
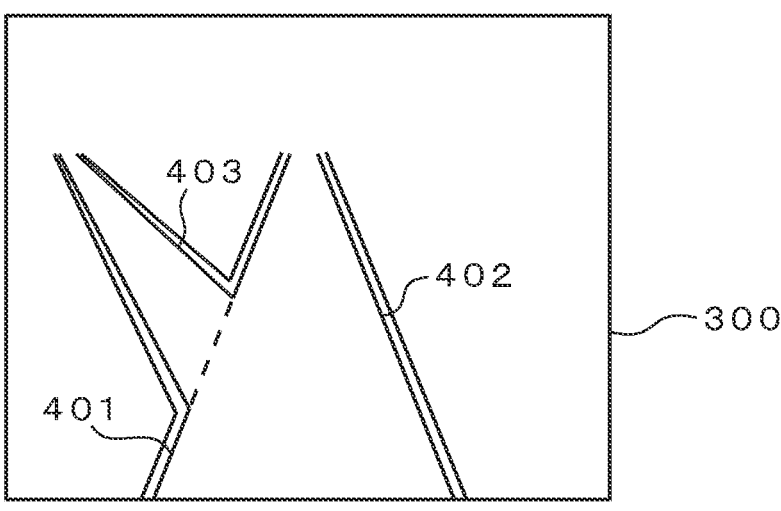
FIG. 9 is a drawing showing yet another example of a front image.

FIG. 9 is a drawing showing another example of a front image. The front image 300 shown in FIG. 9 corresponds to the front image 110 of FIG. 2. The detecting unit 231 may apply an edge detection filter such as a Sobel filter to the front image 300 to detect edge pixels, and it may detect pixels having brightness above a predetermined threshold value among the detected pixels, as candidate points. The locations of the candidate points are represented on the image coordinate system.

The detecting unit 231 groups the candidate points within a predetermined reference number of pixels from the lower end to the upper end of the front image 300, to generate regions 401, 402, 403. The reference number of pixels may be from 5 to 10, for example.

Figure 10:
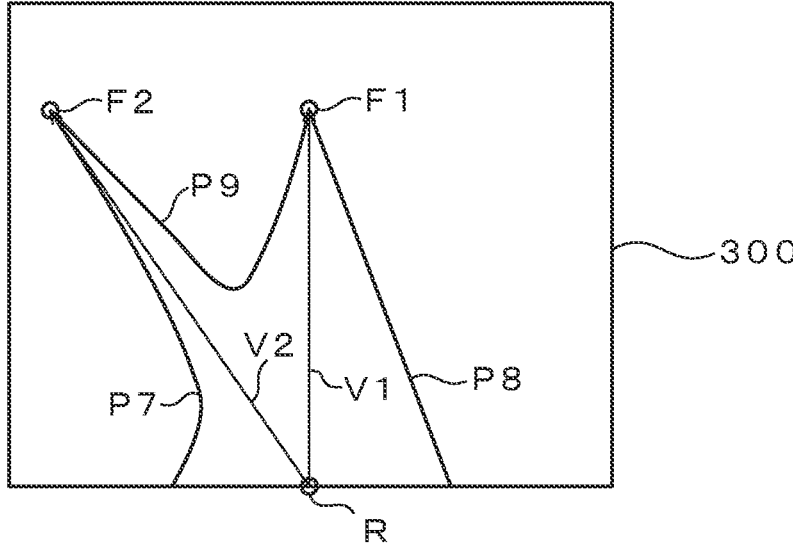
FIG. 10 is a diagram showing detection of a vanishing point and moving direction from a front image (3).

FIG. 10 is a diagram showing detection of a vanishing point and moving direction from a front image 300. The detecting unit 231 finds polynomials based on the respective candidate points for regions 401, 402, 403.

The detecting unit 231 sets the vanishing point for the adjacent regions 402, 403 to be the intersection F1 between curves P8 and P9 represented by the polynomials. The detecting unit 231 also sets the vanishing point for the adjacent regions 401, 403 to be the intersection F2 between curves P7 and P9 represented by the polynomials.

The detecting unit 231 then calculates a vector V1 with the initial point being the reference location R set at the center at the lower end of the front image 200, and the terminal point being the vanishing point F1. The vector V1 represents the moving direction of the vehicle 10. The detecting unit 231 then calculates a vector V2 with the initial point being the reference location R set at the center at the lower end of the front image 200, and the terminal point being the vanishing point F2. The vector V2 represents another moving direction of the vehicle 10.

As explained in detail above, the information processing device can rapidly detect a branching road that branches from a road in which a vehicle is traveling, based on front images representing the environment ahead of the vehicle.

By having the information processing device notify the automatic control device of the lane marking lines of the traveling road on which the vehicle is traveling and the branching road, the automatic control device can generate a driving plan which properly takes into account the region in which the vehicle is traveling.

Modified Example 1 and Modified Example 2 of the information processing device 12 of this embodiment will now be explained with reference to FIG. 11 and FIG. 12.

FIG. 11 is an example of an operation flow chart for information processing according to Modified Example 1, by the information processing device 12 of the embodiment.

This modified example differs from the operation flow chart shown in FIG. 4 in that the processing of steps S209 to S212 is added. The processing in steps S201 to S208 is the same as in steps S101 to S108 described above.

For this modified example, the automatic control device 11 generates a driving plan for the vehicle 10 as described above, after the automatic control device 11 has been notified of the information representing the locations of lane marking lines in the front image (step S207).

When the vehicle 10 is to proceed on the traveling road without exiting from the traveling road to the branching road, the automatic control device 11 generates a driving plan for the vehicle 10 so that it travels in the region between the two lane marking lines delineating the lane of the traveling road, based on the front image.

When the vehicle 10 is to exit from the road 50 to the road 60, the automatic control device 11 generates a driving plan for the vehicle 10 so that it travels in the region between the two lane marking lines delineating the lane of the branching road, based on the front image.

The automatic control device 11 also notifies the information processing device 12 of the driving plan, via the network 13.

The determining unit 232 acquires the driving plan from the automatic control device 11 (step S209). Based on the driving plan, the determining unit 232 then determines whether or not the vehicle 10 is to exit into the branching road (step S210). The driving plan represents a scheduled traveling trajectory for the vehicle 10 until a predetermined time ahead. The determining unit 232 is an example of a third determining unit. In embodiments, the cycle for the information processing time is longer than the cycle for generating the driving plan by the automatic control device 11.

When the scheduled traveling trajectory of the vehicle 10 is indicated as traveling in the region between the two lane marking lines delineating the lane of the branching road, it is determined that the vehicle 10 will exit into the branching road.

When the scheduled traveling trajectory of the vehicle 10 is indicated as traveling in the region between the two lane marking lines delineating the lane of the traveling road, on the other hand, it is determined that the vehicle 10 will not exit into the branching road.

When it has been determined that the vehicle 10 will not exit into the branching road (step S210—No), the removing unit 234 removes the moving direction determined to have a different orientation from the previously detected moving direction (step S211), and the series of processing steps is complete. The removing unit 234 is an example of the first removing unit.

Then when a branching road has been represented in the front image during the next information processing, this branching road is determined to be a newly appearing branching road.

When it has been determined that the vehicle 10 will exit into the branching road (step S210—Yes), on the other hand, the detecting unit 231 sets the previously detected moving direction as the moving direction determined to have a different orientation in excess of a predetermined reference range with respect to the previously detected moving direction (step S212), and the series of processing steps is complete. The removing unit 234 also removes the moving direction of the traveling road from the previously detected moving direction.

Therefore, during the next information processing, the branching road is treated as the traveling road in which the vehicle 10 is traveling.

In the modified example described in detail above, the information processing device changes the previously detected moving direction based on the vehicle driving plan. This allows the information processing device to properly determine the appearance of a branching road in the next information processing.

Figure 12:
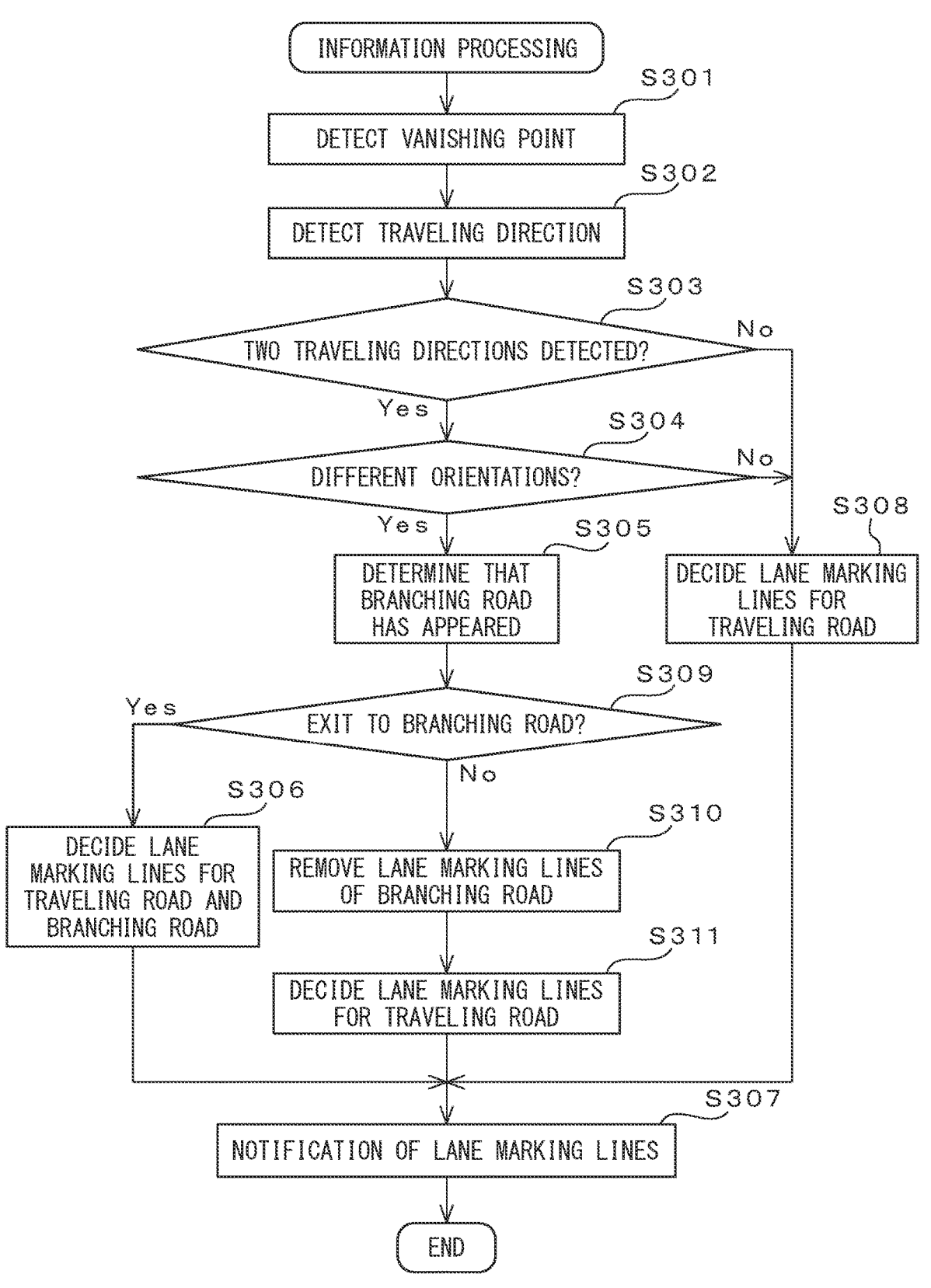
FIG. 12 is an example of an operation flow chart for information processing according to Modified Example 2, by the information processing device of the embodiment.

FIG. 12 is an example of an operation flow chart for information processing according to Modified Example 2, by the information processing device of the embodiment.

This modified example differs from the operation flow chart shown in FIG. 4 in that the processing of steps S309 to S311 is added. The processing in steps S301 to S308 is the same as in steps S101 to S108 described above.

After it has been determined that there has appeared in the front image a branching road which branches from the road on which the vehicle 10 is traveling (step S305), the determining unit 232 refers to the navigation route and determines whether or not the vehicle 10 is scheduled to exit from the traveling road into the branching road within a predetermined range from the current location of the vehicle 10 in the traveling direction (step S309). The predetermined range may be 1 km to 5 km, for example.

When it is not scheduled to exit into the branching road (step S309—No), the removing unit 234 removes the lane marking lines from the branching road (step S310). Specifically, the removing unit 234 removes the lane marking lines that had a vanishing point representing a moving direction determined to have a different orientation, from among the lane marking lines detected in the front image. The removing unit 234 is an example of the second removing unit. The removing unit 234 determines that lane marking lines that had a vanishing point representing a moving direction determined to have a different orientation delineate an adjacent lane which is adjacent to the lane in which the vehicle 10 is currently traveling.

Next, the deciding unit 233 decides on the lane marking lines of the traveling road in which the vehicle 10 is currently traveling in the front image (step S311).

The deciding unit 233 then notifies the automatic control device 11 of the front image and the information representing the locations of the lane marking lines in the front image (step S307), and the series of processing steps is complete. Specifically, the deciding unit 233 notifies the automatic control device 11 of the front image, together with information representing the locations of the two lane marking lines delineating the traveling lane of the traveling road in which the vehicle 10 is currently traveling.

When the vehicle is scheduled to exit into the branching road (step S309—Yes), however, processing proceeds to step S306. The processing in step S306 is the same as in step S106 described above.

In the modified example described in detail above, when the vehicle 10 is not scheduled to exit from the traveling road into the branching road within the predetermined range from the current location of the vehicle 10 in the traveling direction, the automatic control device 11 is notified of the front image from which the lane marking lines of the branching road have been removed.

The automatic control device 11 generates a driving plan for the vehicle 10 so that it travels in the region between the two lane marking lines delineating the traveling lane of the traveling road, based on the front image in which only the lane marking lines of the traveling road are shown. The automatic control device 11 can thus generate a safer driving plan.

The information processing device, computer program for information processing and information processing method of the embodiment described above according to the present disclosure may incorporate appropriate modifications that are still within the gist of the present disclosure. Moreover, the technical scope of the disclosure is not limited to these embodiments, and includes the present disclosure and its equivalents as laid out in the Claims.

The invention claimed is:

1. An information processing device comprising:
a processor configured to
    detect a first vanishing point where a first pair of lane marking lines in a front image representing environment ahead of a vehicle intersect,
    detect a first moving direction of the vehicle from a predetermined reference location to the first vanishing point in the front image,
    detect a second vanishing point where a second pair of lane marking lines in the front image intersect,
    detect a second moving direction of the vehicle from the predetermined reference location to the second vanishing point,
    determine whether the first moving direction and the second moving direction have a different orientation in excess of a predetermined reference range with respect to a previously detected moving direction,
    determine that a branching road that branches from a traveling road in which the vehicle is traveling has appeared in the front image, when it has been determined that the first moving direction and the second moving direction have different orientations in excess of the predetermined reference range with respect to the previously detected moving direction,
    generate a driving plan based on the first pair of lane markings, the second pair of lane markings, and the branching road, and
control the vehicle based on the driving plan.

2. The information processing device according to claim 1, wherein the processor is further configured to
    determine whether or not the vehicle will exit to the branching road based on a driving plan representing a scheduled traveling trajectory of the vehicle, which is generated based on determination results wherein it has been determined that the branching road has appeared, and
    ignore the moving direction determined to have a different orientation from the previously detected moving direction, when it has been determined that the vehicle will not exit to the branching road.

3. The information processing device according to claim 2, wherein the processor is further configured to set the moving direction determined to have a different orientation to be the previously detected moving direction, when it has been determined that the vehicle will exit to the branching road.

4. The information processing device according to claim 1, wherein the processor is further configured to
    determine whether or not the vehicle is scheduled to exit to the branching road which branches from the traveling road on which it is traveling based on a vehicle navigation route, within a predetermined range from the current location of the vehicle in a direction of travel, and
    remove the second pair of lane marking lines that have the second vanishing point, representing the moving direction determined to have a different orientation, from among the first pair of lane marking lines and the second pair of lane marking detected in the front image, when it has been determined that the branching road has appeared and it has been determined that the vehicle is not scheduled to exit from the traveling road to the branching road.

5. The information processing device according to claim 1, wherein the predetermined reference location in the front image represents the location of the vehicle.

6. A computer-readable, non-transitory storage medium storing a computer program for information processing, which causes a processor to execute a process, and the process comprising:
    detecting a first vanishing point where a first pair of lane marking lines in a front image representing environment ahead of a vehicle intersect;
    detecting a first moving direction of the vehicle from a predetermined reference location to the first vanishing point in the front image;
    detecting a second vanishing point where a second pair of lane marking lines in the front image intersect;
    detecting a second moving direction of the vehicle from the predetermined reference location to the second vanishing point;
    determining whether the first moving direction and the second moving direction have a different orientation in excess of a predetermined reference range with respect to a previously detected moving direction;
    determining that a branching road that branches from a traveling road in which the vehicle is traveling has appeared in the front image, when it has been determined that the first moving direction and the second moving direction have different orientations in excess of the predetermined reference range with respect to the previously detected moving direction;
    generating a driving plan based on the first pair of lane markings, the second pair of lane markings, and the branching road; and
controlling the vehicle based on the driving plan.

7. An information processing method carried out by an information processing device and the method comprising:
    detecting a first vanishing point where a first pair of lane marking lines in a front image representing environment ahead of a vehicle intersect;
    detecting a first moving direction of the vehicle from a predetermined reference location to the first vanishing point in the front image;
    detecting a second vanishing point where a second pair of lane marking lines in the front image intersect,
    detecting a second moving direction of the vehicle from the predetermined reference location not the second vanishing point,
    determining whether the first moving direction and the second moving direction have a different orientation in excess of a predetermined reference range with respect to a previously detected moving direction;
    determining that a branching road that branches from a traveling road in which the vehicle is traveling has appeared in the front image, when it has been determined that the first moving direction and the second moving direction have different orientations in excess of the predetermined reference range with respect to the previously detected moving direction;
    generating a driving plan based on the first pair of lane markings, the second pair of lane markings, and the branching road; and
controlling the vehicle based on the driving plan.

* * * * *